US008988604B2

(12) United States Patent
Liu

(10) Patent No.: US 8,988,604 B2
(45) Date of Patent: Mar. 24, 2015

(54) HANDHELD DEVICE AND METHOD FOR DISPLAYING SYNCHRONOUSLY WITH TV SET

(71) Applicant: Huizhou TCL Mobile Communication Co., Ltd., Huizhou (CN)

(72) Inventor: Jiang Liu, Huizhou (CN)

(73) Assignee: Huizhou TCL Mobile Communications Co., Ltd., Huizhou, GD (CN)

( * ) Notice: Subject to any disclaimer, the term of this patent is extended or adjusted under 35 U.S.C. 154(b) by 0 days.

(21) Appl. No.: 14/124,506

(22) PCT Filed: Sep. 21, 2012

(86) PCT No.: PCT/CN2012/081741
§ 371 (c)(1),
(2) Date: Dec. 6, 2013

(87) PCT Pub. No.: WO2013/097498
PCT Pub. Date: Jul. 4, 2013

(65) Prior Publication Data
US 2014/0300810 A1   Oct. 9, 2014

(30) Foreign Application Priority Data

Dec. 29, 2011   (CN) .......................... 2011 1 0450532

(51) Int. Cl.
*H04N 7/01* (2006.01)
*H04N 11/22* (2006.01)
(Continued)

(52) U.S. Cl.
CPC .............. *H04N 7/0122* (2013.01); *G09G 5/00* (2013.01); *H04N 5/04* (2013.01); *G09G 2340/0407* (2013.01); *G09G 2340/145* (2013.01); *G09G 2354/00* (2013.01); *G09G 2360/02* (2013.01)
USPC ........................... 348/445; 348/734; 348/441

(58) Field of Classification Search
USPC ........................................................ 348/734
See application file for complete search history.

(56) References Cited

U.S. PATENT DOCUMENTS 6,288,742 B1* 9/2001 Ansari et al. ............. 348/211.14
2004/0239798 A1* 12/2004 Nayar et al. ................... 348/362
(Continued)

FOREIGN PATENT DOCUMENTS

CN        1848109        10/2006
CN        1897671        1/2007
(Continued)

OTHER PUBLICATIONS

HDMI Specification 1.3a, Nov. 10, 2006.*

*Primary Examiner* — Jefferey Harold
*Assistant Examiner* — Michael Teitelbaum
(74) *Attorney, Agent, or Firm* — Diederiks & Whitelaw, PLC

(57) ABSTRACT

The present invention discloses a handheld device and a method for a handheld device to display synchronously with a TV set. The handheld device includes a display management module for converting output display data into data corresponding to a TV set screen resolution and displaying same on the TV set screen, and an output management module for converting the output display data into data corresponding to a handheld device resolution and displaying same on a handheld device screen synchronously with the TV set screen, the handheld device being connected to the TV set via an HDMI cable. A bidirectional synchronous display function is achieved in the present invention.

13 Claims, 2 Drawing Sheets

(51) Int. Cl.
*H04N 5/44* (2011.01)
*G09G 5/00* (2006.01)
*H04N 5/04* (2006.01)

(56) References Cited

U.S. PATENT DOCUMENTS

2009/0174818 A1* 7/2009 Morita et al. .................. 348/569
2012/0105730 A1   5/2012 Eliezerov et al.

FOREIGN PATENT DOCUMENTS

| | | |
|---|---|---|
| CN | 201422128 | 3/2010 |
| CN | 101727302 | 6/2010 |
| CN | 201820213 | 5/2011 |
| CN | 102231778 | 11/2011 |
| CN | 102547179 | 7/2012 |
| CN | 102572567 | 7/2012 |
| EP | 1240716 | 9/2002 |
| WO | WO 2011/055365 | 5/2011 |

* cited by examiner

HANDHELD DEVICE AND METHOD FOR DISPLAYING SYNCHRONOUSLY WITH TV SET

CROSS REFERENCE TO RELATED APPLICATION

This application represents a National Stage application of International Application No. PCT/CN2012/081741, filed on Sep. 21, 2012. This application claims the benefit and priority of Chinese Application No. 201110450532.1, filed on, Dec. 29, 2011. The entire disclosure of each of the above applications is incorporated herein by reference.

TECHNICAL FIELD OF THE INVENTION

The present invention relates to a handheld device and a display method thereof, and more particularly, to a handheld device and a method for a handheld device to display synchronously with a TV set.

BACKGROUND OF THE INVENTION

The display resolution of most conventional handheld devices is far lower than a standard definition, and much more difficult to achieve a higher definition. However, a user often transmits data in a handheld device to a TV set screen to display the data thereon for getting better sensory experiences. When low-resolution data are transmitted to a display device with a high resolution to be displayed thereon, unfavorable viewing effects, such as stretch and deformation, occur inevitably.

Currently, the existing synchronous display techniques for the handheld devices and TV sets in the market are implemented by hardware. By using plural data paths, these techniques convert the data outputted from the handheld device into output signals in two or more than two paths, which are respectively outputted to the handheld device and the TV set to achieve synchronous displaying. The data path implementations comprise outputting analog signals and outputting digital signals. The former greatly reduces the cost of hardware than the latter. However, the display effect presented on the TV set screen is much worse for the former. The cost of the latter is greatly increased and this increases user's expense. Also, both implementations have a serious defect. Due to distinct resolutions, the display data outputted from the handheld device with a low resolution to the TV set screen will be stretched so as to match the big screen of the TV set. In this display method, the resolution is not increased. The original resolution of the handheld device is still retained. This exceedingly lowers the user's experiences.

As can be seen, the conventional skills need to have a further improvement and development.

SUMMARY OF THE INVENTION

To avoid above disadvantages of the conventional skills, the present invention provides a handheld device and a method for a handheld device to display synchronously with a TV set, for improving clarity of images displayed on the TV set screen, which is generated from the display data outputted from the handheld device, and for clearly displaying the output display data of the handheld device synchronously with the TV set screen.

To solve above technical problems, the schemes provided in the present invention comprises:

A handheld device comprises: a display management module for converting output display data into data that matches a TV set screen resolution and displaying same on a TV set screen, and an output management module for converting the output display data into data that matches a handheld device resolution and displaying same on a handheld device screen synchronously with the TV set screen, the display management module being in communicative connection with the output management module; the handheld device being connected to a TV set via an HDMI cable for obtaining resolution information of the TV set; the handheld device also being used for converting the output display data into data suitable for displaying with the TV set screen resolution; the handheld device also being used for selecting a dual screen display mode, obtaining standard display resolution information of the TV set screen, and initializing the handheld device according to the standard display resolution information.

Amongst, the handheld device is further used for entering the dual screen display mode when the TV set screen is connected therewith, and for preparing related display data that are to be transmitted to the TV set screen and starting an initialization process.

Amongst, the output management module comprises an user interface for operating the handheld device, a handheld device display for displaying images, and a digital-analog converting chip for converting the output display data into the data that matches the handheld device resolution, the user interface being provided on the handheld device display, the digital-analog converting chip being in communicative connection with the handheld device display.

Amongst, the digital-analog converting chip is in communicative connection with the TV set screen through a framebuffer driver of the display management module.

Amongst, the handheld device is further used for destroying an EGL database of the output display data and turning off the framebuffer driver.

Amongst, the framebuffer driver is used for transmitting high-definition display data to the digital-analog converting chip after transmitting the high-definition display data to the TV set screen, and for converting the high-definition display data into handheld display data suitable for the handheld device.

Amongst, the digital-analog converting chip is further used for compressing the output display data into the handheld display data suitable for display resolution of the handheld device.

Amongst, the user interface is further used for providing an interface for operation, and the interface is a switch motion triggered button or a switch motion triggered controller.

A handheld device comprises: a display management module for converting output display data into data that matches a TV set screen resolution and displaying same on a TV set screen, and an output management module for converting the output display data into data that matches a handheld device resolution and displaying same on a handheld device screen synchronously with the TV set screen, the display management module being in communicative connection with the output management module; the handheld device being connected to a TV set via an HDMI cable for obtaining resolution information of the TV set.

Amongst, the output management module comprises an user interface for operating the handheld device, a handheld device display for displaying images, and a digital-analog converting chip for converting the output display data into the data that matches the handheld device resolution, the user interface being arranged on the handheld device display, the digital-analog converting chip being in communicative connection with the handheld device display.

Amongst, the digital-analog converting chip is in communicative connection with the TV set screen through a framebuffer driver of the display management module.

A synchronous display method for a handheld device and a TV set, the handheld device being connected to the TV set via an HDMI cable for obtaining resolution information of the TV set. The method mainly comprises following steps:

A. converting output display data of the handheld device into data suitable for displaying with a TV set screen resolution and displaying same on a TV set screen;

B. converting the output display data into handheld display data suitable for displaying with a handheld device resolution and displaying same on a screen of the handheld device synchronously with the TV set screen.

Amongst, Step A further comprises: the handheld device destroying an EGL database of the output display data and turning off a framebuffer driver, initializing the EGL database according to a standard display resolution of the TV set screen and then turning on the framebuffer driver, obtaining output display data corresponding to the standard display resolution, and displaying same on the TV set screen.

Amongst, Step B further comprises: the framebuffer driver transmitting the output display data to a digital-analog converting chip, the digital-analog converting chip compressing the output display data into the handheld display data suitable for display resolution of the handheld device, and displaying same on a handheld device display synchronously with the TV set screen.

Amongst, before Step A, said method further comprises: the handheld device and the TV set screen being connected to each other, the handheld device selecting a dual screen display mode, the handheld device obtaining a standard display resolution of the TV set screen, and initializing the handheld device according to the standard display resolution.

The present invention provides a handheld device and a method for a handheld device to display synchronously with a TV set, which add a display management module and a output management module as compared to conventional handheld devices. The synchronous display function is achieved by using the display management module to transmit display data, which is suitable for being displayed on the TV set screen, to the TV set screen, and then using a digital-analog converting chip to compress the display data into handheld display data suitable for being displayed on the handheld device display. That is, the display data outputted to the TV set screen is the data that has been processed by software layer and is suitable for TV set screen resolution, rather than a stretched image. This ensures clarity of the displayed images. Also, it only needs to add a digital-analog converting chip to hardware layer, and with this the high-definition display data can be compressed into the handheld display data suitable for the handheld device. The cost of hardware is greatly reduced. This ensures that the handheld device and the TV set screen are synchronized with clear images, and at the same time improves the clarity of images displayed on the TV set screen.

DETAILED DESCRIPTION OF THE INVENTION

The present invention provides a synchronous display method and a handheld device thereof. To make the objectives, technical schemes, and advantages of the present invention more clear and definite, the present invention will be described further in details by using embodiments in conjunction with the appending drawings.

Figure 1:
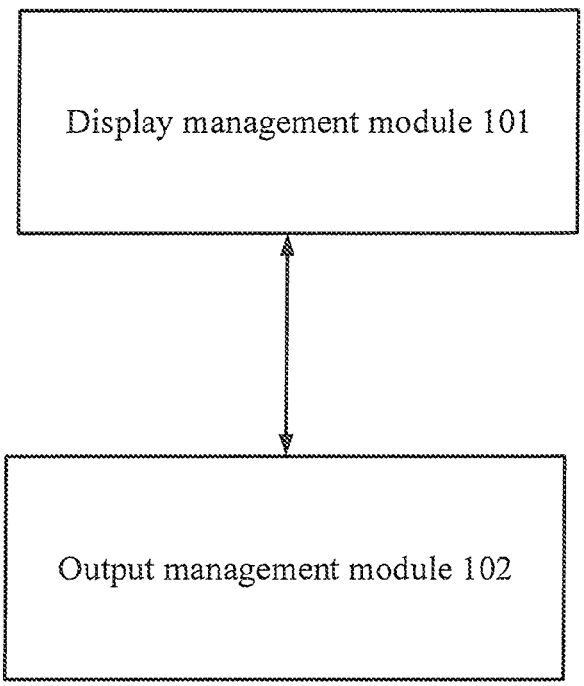
FIG. 1 is a schematic diagram showing a structure of a handheld device of the present invention.

The present invention provides a handheld device, which records and stores audio and video clips. As shown in FIG. 1, the handheld device comprises a display management module 101 for converting output display data into data corresponding to a TV set screen resolution and displaying same on the TV set screen, and an output management module 102 for converting the output display data into data corresponding to a handheld device resolution and displaying same on the handheld device screen synchronously with the TV set screen. The display management module 101 is in communicative connection with the output management module 102. The handheld device is connected to the TV set via an HDMI cable for obtaining resolution information from the TV set. By the modular architecture of the display management module 101 and the output management module 102, the handheld device and the TV set screen can display images synchronously after they are connected to each other, on the premise that the manufacturing cost of the handheld device is reduced.

Figure 2:
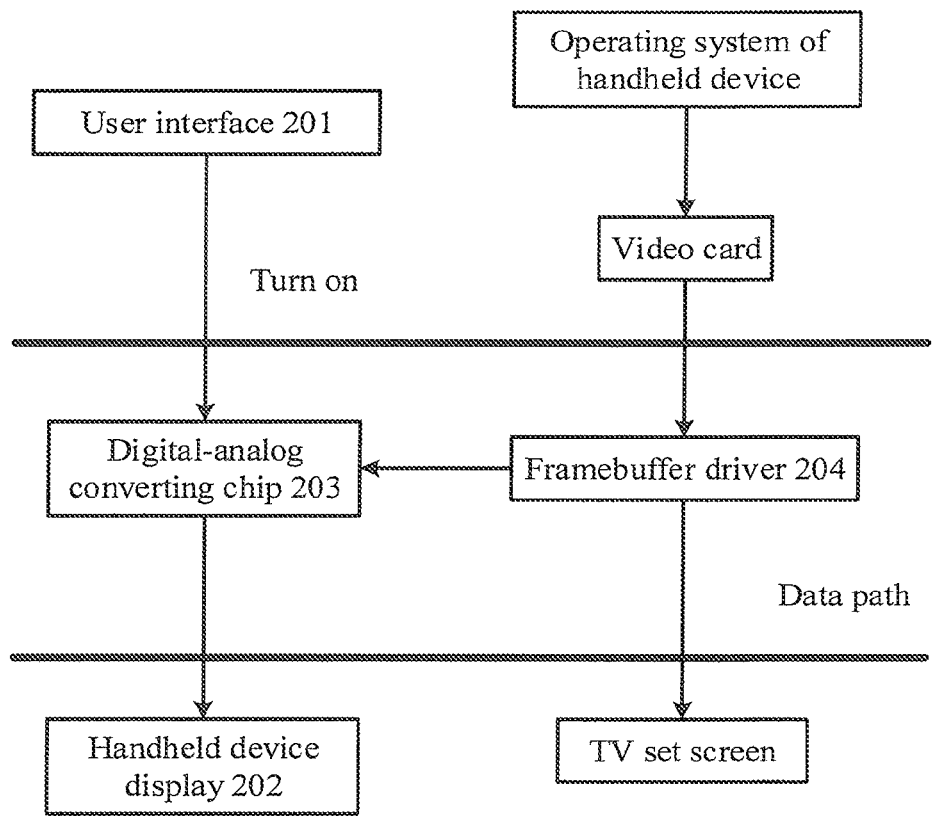
FIG. 2 is a schematic diagram showing a detailed structure of a handheld device of the present invention.

In one preferred embodiment of the present invention, the output management module comprises an user interface 201 for operating the handheld device, a handheld device display 202 for displaying images, and a digital-analog converting chip 203 for converting the output display data into data corresponding to the handheld device resolution, as shown in FIG. 2. The user interface 201 is provided on the handheld device display 202. The user interface of the handheld device provides an interface to operate the handheld device for a user. The interface may be a switch motion triggered button or other switch motion triggered controllers. The digital-analog converting chip 203 is in communicative connection with the handheld device display 202.

Further, the digital-analog converting chip 203 is in communicative connection with the TV set screen through a framebuffer driver 204 of the display management module 101. After the framebuffer driver 204 transmits high-definition display data to the TV set, the high-definition display data are transmitted to the digital-analog converting chip 203, which converts the high-definition display data into handheld display data suitable for the handheld device. This not only ensures that the TV set screen displays high-definition images, but also makes that clear images can be displayed by the handheld device.

Figure 3:
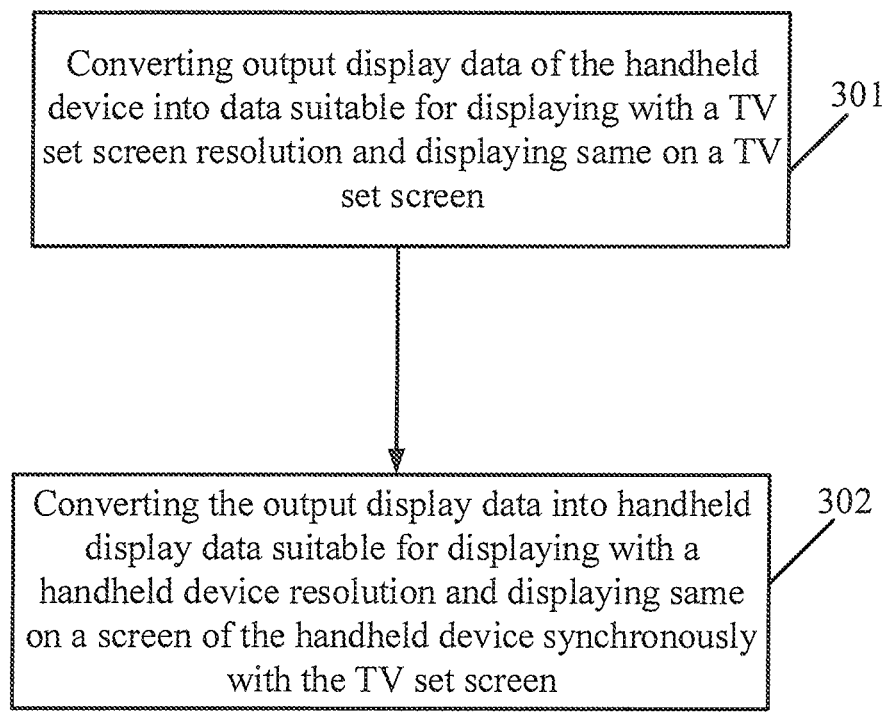
FIG. 3 is a basic flow chart of a synchronous display method of the present invention.

In order to improve performance of the handheld device still further, the present invention also provides a synchronous display method for the handheld device. As shown in FIG. 3, the method comprises following steps.

Step 301: converting output display data of the handheld device into data suitable for displaying with a TV set screen resolution and displaying same on a TV set screen Step 302: converting the output display data into handheld display data suitable for displaying with a handheld device resolution and displaying same on a screen of the handheld device synchronously with the TV set screen.

Step 301 further comprises: the handheld device destroying an EGL database of the output display data and turning off a framebuffer driver 204 (EGL is an interface between OpenGL ES and the underlying native platform windowing system. Various graphics are drawn and displayed in upper layer software by EGL. Only by destroying EGL can the relation between upper layer software and lower layer hardware be broken thoroughly), initializing the EGL database according to a standard display resolution of the TV set screen and turning on the framebuffer driver 204, obtaining output display data corresponding to the standard display resolution, and displaying same on the TV set screen.

Further, Step 302 comprises: the framebuffer driver 204 transmitting the output display data to a digital-analog converting chip 203, the digital-analog converting chip 203 compressing the output display data into the handheld display data suitable for the display resolution of the handheld device, and displaying same on the handheld device display synchronously, thereby achieving synchronous display function for the video and audio clips recorded in the handheld device.

Before Step 301, the method further comprises: the handheld device and the TV set screen being connected to each other for obtaining the resolution information of the TV set, the handheld device selecting a dual screen display mode, the handheld device obtaining standard display resolution information of the TV set screen, and initializing the handheld device according to the standard display resolution information.

The handheld device and the TV set screen are connected to each other and enter the dual screen display mode. The handheld device prepares related display data that are to be transmitted to the TV set screen. At the same time, the handheld device starts an initialization process, that is, the handheld device destroys the EGL database of the output display data and turns off the framebuffer driver 204. After that, the handheld device initializes the EGL database, that is, initializing the EGL database according to the standard display resolution of the TV set screen, and then turns on the framebuffer driver 204, obtains output display data corresponding to the standard display resolution, and displays same on the TV set screen. The synchronous framebuffer driver 204 transmits the output display data to the digital-analog converting chip 203. The digital-analog converting chip 203 compresses the output display data into the handheld display data suitable for the resolution of the handheld device display, and the images are displayed on the handheld device display synchronously with the TV set screen. This ensures that the handheld device and the TV set screen are synchronized with clear images, and at the same time improves the clarity of images on the TV set screen, reducing the manufacturing cost of the handheld device.

It should be understood that the above descriptions of the preferred embodiments are more detailed but the scope of the present invention must not, therefore, be limited thereto. Various modifications such as alterations and simple combinations can be made by a person skilled in this filed under the teaching of the present invention, without departing from the scope the present invention seeks to be protected. These are all falling into the protective scope of the present invention. The protective scope of the present invention is based on the range defined by the appending claims.

What is claimed is:

1. A handheld device, which is coupled with a TV set via an HDMI cable to obtain information of a screen resolution of the TV set, the handheld device comprising:
    a display management module for converting output display data into TV set display data that matches the screen resolution of the TV set and displaying the TV set display data on the TV set screen; and
    an output management module communicated with the display management module for compressing the output display data into handheld device display data that matches a handheld device display resolution and displaying the handheld device display data on a screen of the handheld device synchronously with the TV set;
    wherein the output management module comprises a digital-analog converting chip that is coupled with the TV set screen through a framebuffer driver of the display management module, and the handheld device is used for destroying an EGL database of the output display data and turning off the framebuffer driver.

2. The handheld device according to claim 1, wherein the handheld device provides a dual screen display mode, and the handheld device enters the dual screen display mode when the TV set screen is connected therewith and obtains standard display resolution information of the TV set screen, and then the handheld device is initialized according to the standard display resolution information and transmits the TV set display data to the TV set.

3. The handheld device according to claim 1, wherein the output management module further comprises:
    a handheld device display for displaying images; and
    an user interface provided on the handheld device display for a user to operate the handheld device;
    wherein the digital-analog converting chip communicated with the handheld device display for converting the output display data into the handheld device display data that matches the handheld device display resolution.

4. The handheld device according to claim 3, wherein the framebuffer driver transmits high-definition display data to the TV set screen and then to the digital-analog converting chip, and the digital-analog converting chip converts the high-definition display data into the handheld device display data suitable for the handheld device.

5. The handheld device according to claim 4, wherein the digital-analog converting chip of the output management module compresses the high-definition display data into the handheld device display data suitable for the handheld device display resolution.

6. The handheld device according to claim 5, wherein the user interface of the output management module provides an interface, which is a switch motion triggered button or a switch motion triggered controller.

7. A method for displaying images on a handheld device synchronously with a TV set, the handheld device being coupled with the TV set via an HDMI cable to obtain information of a screen resolution of the TV set, said method comprising steps of:
    A. converting output display data of the handheld device into TV set display data according to the screen resolution of the TV set and displaying the TV set display data on the TV set screen; and
    B. compressing the output display data into handheld device display data according to a display resolution of the handheld device and displaying the handheld device display data on a screen of the handheld device synchronously with the TV set;
    wherein Step A comprises:
        destroying an EGL database of the output display data and turning off a framebuffer driver, in which EGL is an interface between OpenGL ES and an underlying native platform windowing system.

8. The method according to claim 7, wherein Step A further comprises:
    initializing the EGL database according to a standard display resolution of the TV set screen;

turning on the framebuffer driver to output the TV set display data that corresponds to the standard display resolution; and displaying the TV set display data on the TV set screen.

9. The method according to claim 8, wherein Step B further comprises:

transmitting the output display data by the framebuffer driver to a digital-analog converting chip;

compressing the output display data by the digital-analog converting chip into the handheld device display data suitable for the display resolution of the handheld device; and displaying the handheld device display data on the screen of the handheld device synchronously with the TV set screen.

10. The method according to claim 7, wherein before Step A, said method further comprises:

connecting the handheld device and the TV set to each other;

selecting a dual screen display mode in the handheld device; and obtaining a standard display resolution of the TV set by the handheld device.

11. A method for displaying images on a handheld device synchronously with a TV set, in which EGL is an interface between OpenGL ES and an underlying native platform windowing system in the handheld device and a framebuffer is a buffer in the handheld device that contains a bitmap of a complete frame of data, said method comprising steps of:

a. coupling the handheld device with the TV set to obtain a standard display resolution of the TV set screen;

b. destroying an EGL database of the handheld device and turning off a driver of the framebuffer;

c. initializing the EGL database according to the standard display resolution of the TV set screen and then turning on the driver of the framebuffer;

d. transmitting display data corresponding to the standard display resolution from the framebuffer to the TV set and displaying the transmitted display data on the TV set screen; and e. compressing the display data corresponding to the standard display resolution into handheld device display data suitable for a display resolution of the handheld device and displaying the handheld device display data on a screen of the handheld device synchronously with the TV set screen.

12. The method according to claim 11, wherein in Step a, the handheld device is coupled with the TV set via an HDMI cable.

13. The method according to claim 11, wherein in Step e, the display data corresponding to the standard display resolution is compressed by using a digital-analog converting chip in the handheld device.

* * * * *